June 19, 1945.  F. A. CARSTENS  2,378,686

ELECTRIC WELDED CRANKSHAFT

Filed Aug. 31, 1942  2 Sheets-Sheet 1

Fritz A. Carstens
INVENTOR.

BY
ATTORNEY.

June 19, 1945.  F. A. CARSTENS  2,378,686

ELECTRIC WELDED CRANKSHAFT

Filed Aug. 31, 1942  2 Sheets-Sheet 2

Fritz A. Carstens
INVENTOR.

BY
ATTORNEY.

Patented June 19, 1945

2,378,686

UNITED STATES PATENT OFFICE 2,378,686

ELECTRIC WELDED CRANKSHAFT

Fritz A. Carstens, Milwaukee, Wis., assignor to A. O. Smith Corporation, Milwaukee, Wis., a corporation of New York Application August 31, 1942, Serial No. 456,782

9 Claims. (Cl. 74—597)

This invention relates to an electric welded crankshaft and more particularly to the construction of a crankshaft comprising individually heat-treated parts welded together by welds having physical properties comparable to the metal of the individual parts.

Crankshafts constructed heretofore were subjected to the risk of distortion and warpage by machining and heat-treatment after the several parts of the crankshaft were finally assembled. Particularly with respect to the heat-treatment of the crankshaft to increase its tensile strength, the risk of distortion of the shaft by such treatment has often resulted in the construction of crankshafts without the full strength of the steel being obtained. The problem of distortion becomes increasingly difficult with the making of large-sized crankshafts such as might be employed in large Diesel engines and the like. The present invention employs high tensile strength low alloy steel susceptible to improvement of its physical properties by heat-treatment.

The invention seeks to eliminate the past difficulties by providing a crankshaft of substantially high tensile strength that is not subject to distortion or warpage by final heat-treating operations or excessive machining.

One object of the present invention is to provide improved crankshafts for large internal combustion and steam engines and that can be constructed with considerable accuracy and rapidity to provide a large volume of production;

Another object is to construct a welded crankshaft in which the welds employed have substantially the same physical characteristics as the stock metal;

Another object is to provide a stronger crankshaft per unit of weight;

A further object is to provide a durable crankshaft of high ultimate tensile strength capable of carrying normal loads for a considerable length of time without breakdown; and Another object is to provide a welded crankshaft with throws that have an improved grain line flow arrangement that substantially strengthens the crankshaft to withstand the stresses to which it is subjected in operation, and provides a better union with the weld metal.

These and other objects of the invention will appear from the following description of an embodiment of the invention illustrated in the accompanying drawings.

Figure 1:
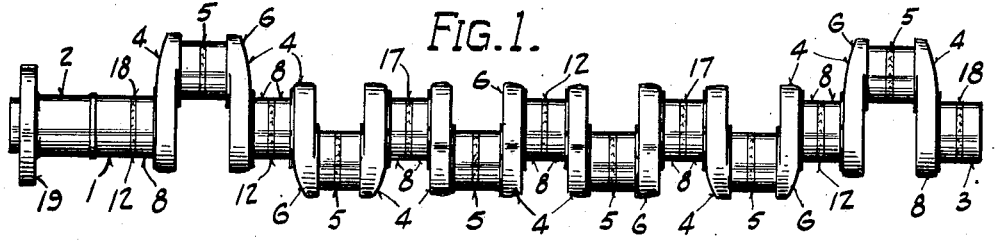
Figure 1 is a side elevation of a Diesel engine crankshaft.

Referring to the drawings there is illustrated a substantially large diameter crankshaft 1 particularly adapted for use in a large Diesel engine and having generally cylindrical end pieces 2 and 3, and the single cheek units 4 joined together by welds 5 to provide the single throws or double cheeks 6. The single throws 6 are in turn assembled and welded together to form the main portions of the shaft.

The cheeks 4 which form the basic units of the crankshaft are each preferably constructed in a similar manner from blanks of low alloy steel of high tensile strength. In early tests of the invention, the steel of the blanks from which the cheeks 4 were formed had a percentage composition as follows:

|  | Per cent |
|---|---|
| Carbon | .15 to .20 |
| Manganese | 1.17 to 1.45 |
| Sulphur | .022 to .05 |
| Phosphorus | .016 to .04 |
| Silicon | .16 to .25 |
| Vanadium | .10 to .14 |
| Iron | Remainder |

This composition developed an ultimate tensile strength in the steel of 80,000 pounds per square inch and a yield point of 50,000 pounds per square inch. It is understood that the composition of the steel may be varied from that of these early tests to obtain the tensile strength or yield point that may be desired.

Each cheek unit 4 is provided with the generally large diameter crankpin stub 7 on one side and diagonally opposite therefrom is disposed a generally large diameter journal stub 8. The depressions or indentations 9 disposed back of the respective stubs 7 and 8 and in axial alignment therewith provide the metal that fills the outer edges of each stub when the cheek unit is formed.

The stubs 7 and 8 and the depressions 9 are forged from a suitable metal blank to provide the cheek unit 4, preferably by a drop-forging operation while the blank is at forging temperatures.

Figure 2:
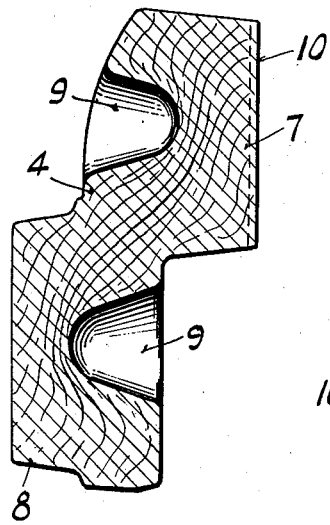
Fig. 2 is a sectional view of a single forged cheek unit of the crankshaft showing the journal and crankpin stubs, and showing the grain flow.
Figure 5:
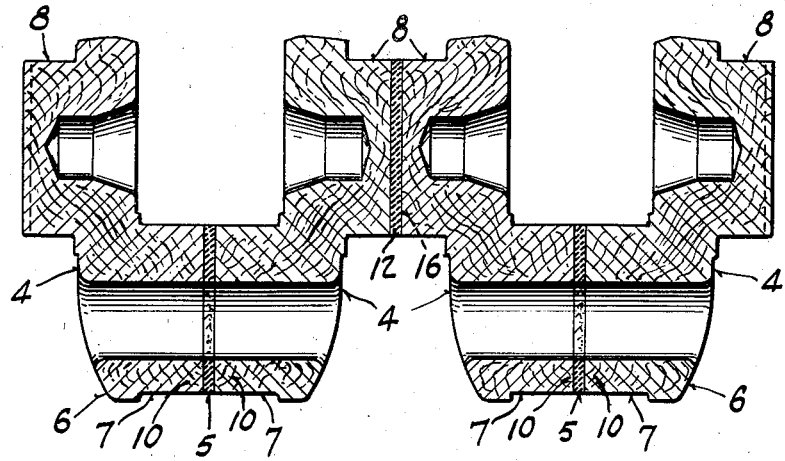
Fig. 5 is a sectional view of the two center throws assembled together, showing the grain flow and the welds.
Figure 6:
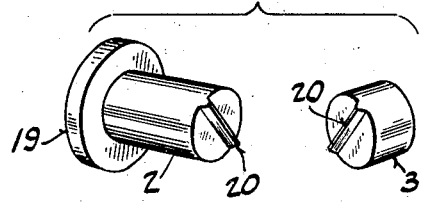
Fig. 6 is a perspective view of the end pieces of the crankshaft.
Figure 7:
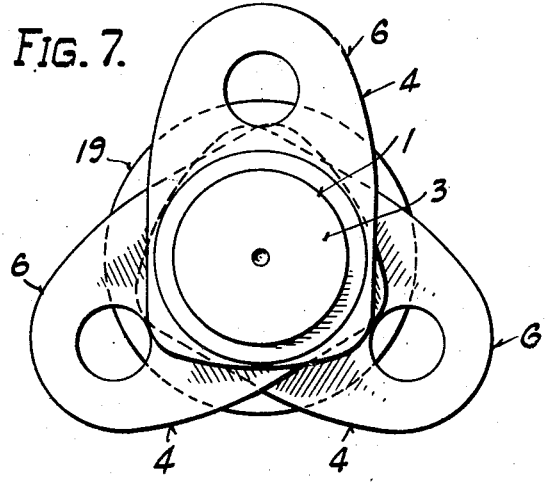
Fig. 7 is an end view of a completed crankshaft, viewed from the right of Fig. 1.

The indentations 9 eliminate excessive machining and the forming of the indentations provides each cheek 4 with a snakelike grain flow that greatly increases the strength of the cheek to resist stress. Figs. 2 and 5 illustrate the type of grain flow developed and it will be noted that each line of grain travels in a curved or snake-like manner from the bottom to the top of the cheek by a course that roughly follows the contour of the cheek itself.

Figure 3:
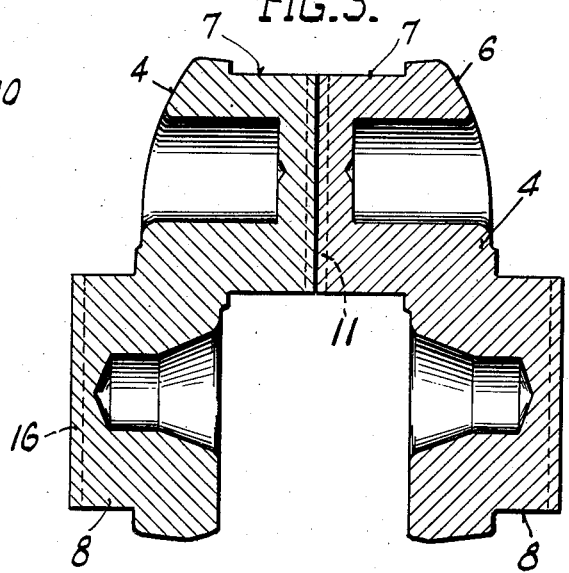
Fig. 3 is a sectional view of two cheek units machined and assembled together as for welding to provide a throw, and showing the welding groove in dotted lines.

After the cheeks 4 are machined, the end grain of each cheek is exposed in the longitudinal direction of the crankshaft and appears as particularly illustrated in Fig. 5. When the edges of the crankpin stubs 7 of two cheeks 4 are disposed in adjoining relation as illustrated in Fig. 3 to be welded into a throw 6 by weld 5, the cheeks have an end-to-end grain flow that extends parallel to the contour of the crankshaft. The most desirable flow of the grain is disposed at the outer zenith of each cheek as illustrated at 10, Figs. 2 and 5. This area is subjected to greater stress than the other portions of the cheek and the longitudinal direction of the grain flow in this area provides greater strength in the structure to resist stress when the crankshaft is assembled and in operation.

After the forging of the cheek units is completed and before any welding is performed, each cheek is individually subjected to a plurality of heating and cooling steps to improve the physical properties of the steel. These steps are accomplished preferably by the method described in the application, Serial No. 456,783, filed on even date herewith by the present inventor and entitled: "Method of making crankshafts by electric welding."

The weld 5 is disposed to join two cheeks 4 together by welding the crankpin stub 7 of one cheek to the crankpin stub 7 of another cheek. The welding is preferably done by an electric arc welding process under which weld metal is deposited by a metallic electrode in the welding groove 11 provided between the adjoining crankpin stubs by scarfing the opposed edges of the same prior to welding. The electrodes should be of low alloy steel of a composition that will effect a deposit having physical properties comparable to those of the heat-treated cheeks. For this purpose, various weld deposits may be employed.

The groove for weld 5 is separated into two equal halves by lips 11 disposed on and extending across the central portion of the face of each crankpin stub 7. The lip on one pin stub engages the lip on the other pin stub to provide a base upon which the weld metal may first be disposed in making the weld 5. The weld is gradually built up in each half of the groove preferably by the method described and claimed in the copending application above referred to.

The weld metal deposited to provide the weld 5 is a high tensile strength alloy composition comprising ordinary steel and substantially small percentages of vanadium, chromium and molybdenum.

A suitable composition for the weld deposit is as follows:

Carbon _____ per cent__ .06
Manganese _____ do____ .40
Silicon _____ do____ .12
Phosphorus _____ do____ .014
Sulphur _____ do____ .018
Chromium _____ Trace
Nickel _____ Trace
Vanadium _____ per cent__ .04
Molybdenum _____ do____ .63

The weld has physical properties comparable to that of the metal of cheeks 4 after the cheeks have been subjected to heat-treatment as previously described. The deposit of weld metal 5 by electric arc processes does not destroy the improved physical characteristics provided in the main body of the cheeks by the heat treatment.

The welds 5 and stubs 7 are machined and ground on the outside to provide a smooth, cylindrical bearing surface. The inside of the welds 5 and stubs 7 is milled out to lighten the weight of the shaft.

Welds 12 secure the journal stubs 8 of six throws 6 together to form the crank pairs 13, 14 and 15. The welds 12 disposed between each pair are preferably made the same and have the same physical properties and structure as the welds 5.

The welds 12 are of a thickness and tensile strength comparable to that of the welds 5 and each weld is machined inside and outside the bearing.

Figure 4:
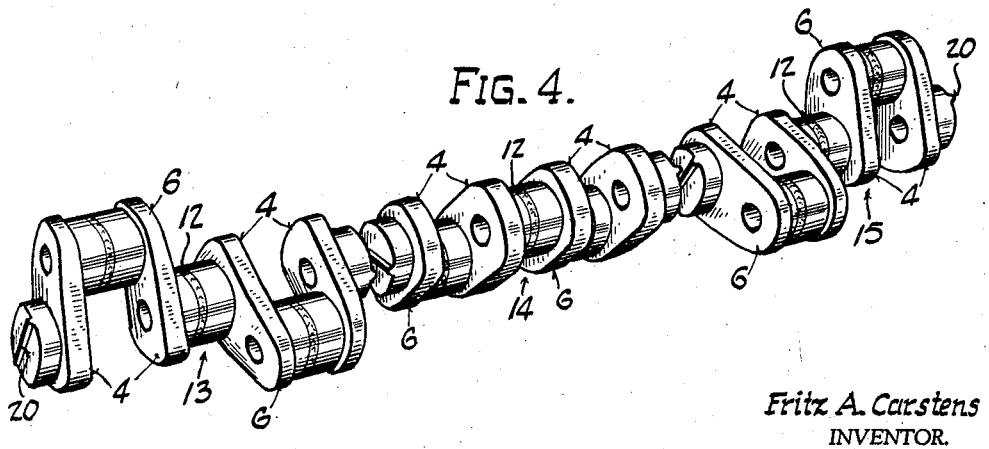
Fig. 4 is a perspective view of three pairs of throws assembled together prior to welding.

Fig. 4 illustrates the crank throw pairs 13, 14 and 15 for a six-cylinder engine. As in the case of the cheek units, these crank pairs have the welding grooves 16 disposed between each pair to receive weld metal 12, and the engaging lips on the face of each journal stub provide a base for the weld deposit.

The pairs 13, 14 and 15 are welded with their respective crank pins 7 angularly arranged about the axis of the journals 8. Pair 13 has one crankpin rotated 120° from its other crankpin, while pair 14 has its crankpins aligned with each other, and pair 15 has one crankpin rotated 120° from its other pin but in the opposite direction from the rotation in pair 13. The aligned throws of pair 14 are arranged with a rotation of 120° from the throws of 13 and 15 adjacent thereto. Different angular arrangements of the throws may be employed to suit different engine designs.

Welds 17 unite the pairs of throws at the intermediate journals by joining the journal stubs 8 of throws 13 and 15 to adjacent stubs on throw 14. The welds 17 compare favorably in thickness and tensile strength to the welds 5 and 12 and like those welds, welds 17 are preferably made by means of electric arc welding processes and machined to provide the correct journal contour. The welding groove is also divided in half by engaging lips disposed on the faces of the respective stubs. This provides a base for the deposit of weld metal 17 as is the case with respect to weld 5.

Welds 18 join the assembled crank throw pairs to the shaft end pieces 2 and 3. One of these welds joins the journal stub at one end of the assembled crank pairs and the end piece 2. The other weld joins the journal stub at the other end of the assembled crank pairs and the end piece 3. The end pieces 2 and 3 are generally cylindrical members and the end piece 2 has the flange 19 disposed at the outer end thereof. The end pieces have physical properties similar to the cheek units and are similarly heat-treated before welding to increase their physical properties.

The welding grooves between the journal stubs and the respective end pieces in which weld metal 18 is deposited are substantially the same as those provided for welds 5, 12 and 17. The grooves are divided in half by lips 20 disposed through the central portion of the faces of the end pieces and the journal stubs which are welded together. The lips form a base for the deposit of weld metal in the initial welding operation.

In assembling the crankshaft described, the cheek units 4 are first made from suitable steel blanks preferably by a drop-forging operation under which each cheek is provided with a crankpin stub 7, a journal stub 8 and indentations 9 in back of and in line with the axis of each stub. Each cheek 4 is then machined and individually heat-treated in such a manner as to improve its physical properties.

A pair of cheeks 4 are then joined together by electric arc welding the crankpin stub of one cheek to the crankpin stub of another cheek by weld metal 5 to provide throw 6. In the drawings illustrating the invention, the crankshaft disclosed is for a six-cylinder engine, and twelve cheek units are welded together in this manner to provide six throws 6.

When a crankpin is completed by joining two crank stubs together, the outside of the pin, including the weld 5, is machined to provide a smooth, cylindrical bearing surface. The inside of the pin is milled out by an annular cutter that leaves the center core intact, as well as machining the pin, including the weld area, to uniform thickness. The core can then be removed to provide a test block for testing operations to ascertain the strength of the joint formed by welding the two cheeks together.

The throws 6 are next welded together in pairs by the welds 12 disposed between the journal stubs thereof to provide the crank pairs 13, 14 and 15. The crank pairs when completed are disposed with their journals in line and their pins angularly offset in the manner previously described. The welding operation is performed in essentially the same manner as in the case of the cheeks 4 to obtain a test block. It is important that the welds 12 like the welds 5 be carefully made and machined to provide for uniformity.

The next step in building up crankshaft 1 is accomplished by joining the crank pairs 13, 14 and 15 together by welding the inner journal stub 8 of the crank pair 13 to one of the journal stubs of the central crank pair 14 and the inner journal stub 8 of crank pair 15 to the other journal stub of central crank pair 14. The welds 17 provided in this operation are similar to welds 5 and 12.

The assembly of the crankshaft 1 is completed by assembling the end pieces 2 and 3 at opposite ends of the crank pair assembly, respectively, and welding the same thereto by depositing weld metal 18 between the inner faces of the end pieces and outer journal stubs 8 of the crank pair assembly.

Thereafter the crankshaft 1 is subjected to a stress-relieving treatment to remove stresses introduced in assembling and joining the separate parts of the same together. During the stress-relieving operation the crankshaft is heated to about 1200° F. and should be supported in a fixture providing for its rotation and for its support against warpage.

There are important considerations in gradually building up a crankshaft by the separate welds described. It is generally known that residual stress remains in welded structures on completion of welding due to the contraction of the weld metal upon cooling. The stress is established by the tendency of the contracting metal to pull the joint edges together or deflect the edges or other component portions of the structure causing distortion of the structure.

Some difficulties arising from any attempt to assemble and weld all of the units at one time may be appreciated from the realization that in large crankshafts of the kind referred to the shrinkage of the welds totals over an inch in the length of the crankshaft. By successive alternate assembling and welding operations as carried out in constructing the crankshaft of the present invention, the difficulties of holding the parts in jigs and of carrying on the welding operations without distortion are minimized. By providing individually-made welds and in not starting another weld until the previously-made weld has cooled, warping of the crankshaft is prevented even though actual shrinkage of each individual weld occurs. Furthermore, by providing a weld of almost equal thickness throughout the cross section of the respective pins, a more uniform shrinkage is obtained with less tendency to distort.

The procedure of welding should be one that will balance the stresses on opposite sides of the lips which close the bottom of the welding grooves, as set forth in United States Patent No. 1,812,123 to Richard Stresau. In this procedure a few initial layers of metal are deposited in the groove above the lips, and then the structure is turned over and a similar number of layers are deposited on the opposite side of the lips. The structure is then turned to its original position and more weld metal deposited in the first-mentioned groove. By alternately depositing weld metal in the opposite grooves and allowing the metal to cool between such alternate operations, the stresses resulting from the contraction of the weld metal have a tendency to balance each other and there is less distortion of the structure during and after welding.

The electric arc welding method has been found to be particularly advantageous in producing the crankshafts of the present invention since with this method a very limited heating of the previously heat-treated stock of the cheeks results under careful welding technique. That part of the cheek stock that is raised by the arc to temperatures above the critical in order to effect the required fusion with the deposited weld metal is subjected to a quenching effect from the surrounding, substantially cool block of metal being welded. The weld grooves should be as narrow as possible, consistent with the making of good welds so that the entire weld deposit will be subjected to this quenching action in cooling. If desirable in any given instance additional cooling means may be resorted to. With this construction the weld areas may be said to be heat-treated in a manner to raise their strength. The heat-treatment of the several parts and welds as described does not result in distortion, as would be the result if the entire crankshaft were subjected to a heat-treatment after fabrication to provide the enhanced physical properties.

It will also be understood that various alloy compositions may be employed in the base metal of the cheeks as well as in the weld metal. The weld metal should have a tensile strength and yield point comparable to that of the base metal of the cheeks after the base metal has been heat-treated to improve its physical properties. By employing a weld metal of the strength of the heat-treated base metal of the cheek units, and with careful welding technique that does not effect undue heat penetration into the cheeks, the welding of the units will not destroy the relative over-all strength of the heat-treated metal, and a stronger, lighter-weight crankshaft will be produced. The final stress-relieving operation is carried out at a temperature below the lower critical point of the steel, and consequently leaves the enhanced physical properties of the heat-treated base metal present.

The invention provides a strong, durable crankshaft that is capable of carrying heavy loads per unit of weight. The crankshaft provided by the invention is readily assembled and since distortion is substantially eliminated, it is not necessary to weaken it by straightening or excessive machining.

The invention also provides a crankshaft whose base metal is at a high ultimate tensile strength and which is joined together by welds of comparable strength.

Various embodiments of the invention may be employed within the scope of the accompanying claims.

I claim:

1. A crankshaft comprising a plurality of cheek and end units joined together at a plurality of joints therebetween by deposited weld metal, the said cheek and end units being formed of low alloy steel and having substantially enhanced tensile strength of the character of that provided by heat-treatment prior to said welding, the mass of said units being such that the enhanced tensile strength thereof is retained and the weld metal having a tensile strength similar to that of the heat-treated steel of said cheek and end units.

2. A crankshaft formed of low alloy steel containing manganese and vanadium and comprising a plurality of pre-heat treated cheek and end units joined together at a plurality of joints therebetween by weld metal electric arc deposited in said joints, the mass of said units being such that the enhanced tensile strength thereof is retained, and the metal of said crankshaft including said weld metal having a final tensile strength of not less than about 80,000 pounds per square inch.

3. A crankshaft comprising a plurality of cheek and end units joined together at a plurality of joints therebetween by deposited weld metal, the metal at the edges of said units adjacent said joints having a substantial amount of end grain exposed to the weld to effect a union of the weld and stock metal under conditions providing joints of high tensile strength, the said cheek and end units being formed of low alloy steel having substantially enhanced tensile strength of the character of that provided by heat-treatment prior to said welding, the mass of said units being such that the enhanced tensile strength thereof is retained and the weld metal having a tensile strength similar to that of the heat-treated steel of said cheeks and end units.

4. A crankshaft of high tensile strength low alloy steel, comprising a plurality of heat-treated cheeks having maximum enhanced physical properties before assembly thereof together and a pair of generally cylindrical end pieces having physical qualities similar to said cheeks, crankpin stubs disposed on one side of each of said cheeks and journal stubs disposed on the diagonally opposite side thereof, a plurality of separate electric arc welds joining the crankpin stubs of the several cheeks in pairs, similarly constructed welds joining the journal stubs of the several cheeks in pairs, and electric arc deposited weld metal joining each of the end pieces to the opposite free ends of the journal stubs of the assembled cheeks, the mass of said cheeks and end pieces being such that the enhanced physical properties thereof are retained, the tensile strength of each of said welds being substantially the same as the tensile strength of the stock metal of said cheeks and the crankshaft being free from distorting of the character resulting from final heat-treatment to increase the tensile strength thereof.

5. A crankshaft for large engines, comprising a plurality of individually heat-treated parts welded together under conditions of thermal conductivity providing a quenching of the welds, and in which the parts have sufficient mass adjacent the welds to retain the heat treatment characteristics of the individual parts and the crankshaft is substantially free from distortion which would result from subjecting the same to a heat-treatment after fabrication of a kind enhancing the strength of the metal, the welds having substantially the same strength as said heat treated parts.

6. In a crankshaft of the class described, a welded transverse joint disposed near the longitudinal center of a cylindrical element of the shaft, and having interfused layers of weld metal extending in substantially parallel relation across the transverse faces of the element and interfused therewith, as distinguished from layers that are laid circumferentially around the element.

7. In a crank shaft of the class described, a welded transverse joint disposed near the longitudinal center of a cylindrical element of the shaft, and having interfused layers of weld metal extending in substantially parallel relation across the transverse faces of the element and interfused therewith, as distinguished from layers that are laid circumferentially around the element, said layers of deposited weld metal being balanced against one another upon opposite sides of the element to reduce distortion and avoid misalignment of the parts in the final structure.

8. In the manufacture of crankshafts for large Diesel engines and the like, the steps comprising forging cheek members with crank stubs and journal stubs, heat-treating the same to increase the strength thereof, and welding the same together centrally of the corresponding crank and journal stubs, the relative mass of the respective crank and journal sections being such as to effect a quenching of the weld metal upon cooling of the latter without destroying the effect of said heat-treatment and the welding process concentrating the welding heat and being such as to provide for its rapid dispersion into the adjacent metal during cooling.

9. In the manufacture of crankshafts for large Diesel engines and the like, first separately forging, heat-treating and machining individual like parts of the shaft, welding separate pairs of said parts together by arc deposit and interfusion of successive thin layers of weld metal therebetween thereby simultaneously effecting a quenching and heat-treatment of the welds without distorting the parts, similarly welding the pairs into a central section for the crankshaft, and welding end members to the crankshaft to provide a heat-treated crankshaft that is strong for its weight, the mass of said parts being such as to provide for the rapid dissipation of the welding heat without destroying the characteristics of the parts resulting from said heat-treatment.

FRITZ A. CARSTENS.